(12) United States Patent
Truong et al.

(10) Patent No.: US 10,834,467 B2
(45) Date of Patent: *Nov. 10, 2020

(54) SINGLE BUTTON SELECTION TO FACILITATE ACTIONS IN A COMMUNICATIONS NETWORK

(71) Applicant: The DIRECTV Group, Inc., El Segundo, CA (US)

(72) Inventors: Heather Nga Truong, Anaheim, CA (US); Hai Kim Nguyen, Torrance, CA (US); Sudheer Bandela, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 15/884,530

(22) Filed: Jan. 31, 2018

(65) Prior Publication Data

US 2018/0227636 A1   Aug. 9, 2018

Related U.S. Application Data

(63) Continuation of application No. 15/426,545, filed on Feb. 7, 2017, now Pat. No. 9,918,135.

(51) Int. Cl.
*H04N 7/173*         (2011.01)
*H04N 21/4784*    (2011.01)
(Continued)

(52) U.S. Cl.
CPC ....... *H04N 21/4784* (2013.01); *H04N 21/235* (2013.01); *H04N 21/47815* (2013.01); *H04N 21/812* (2013.01)

(58) Field of Classification Search
CPC ......... H04N 21/4784; H04N 21/47815; H04N 21/235; H04N 21/812
(Continued)

(56) References Cited

U.S. PATENT DOCUMENTS 6,233,389 B1   5/2001   Barton et al.
6,593,941 B1   7/2003   Sameshima
(Continued)

OTHER PUBLICATIONS

Notice of Allowance dated Nov. 1, 2017 for U.S. Appl. No. 15/426,545, 70 pages.

*Primary Examiner* — Michael B. Pierorazio
(74) *Attorney, Agent, or Firm* — Amin, Turocy & Watson, LLP

(57) ABSTRACT

Single button selection to facilitate actions in a communications network are provided herein. In one embodiment, a method can comprise facilitating, by a network device of a wireless network and comprising a processor, a first transmission of a multimedia content stream to a communications device. The multimedia content stream can comprise a main content item and a supplemental content item that supplements the main content item. The method can also include in response to a request from the communications device for additional information related to the supplemental content item, facilitating, by the network device, a second transmission, to the communications device, of data that comprises the additional information. Based on an indication, received from the communications device, of an acceptance of the data related to the supplemental content item, the method can include facilitating, by the network device, an action related to the supplemental content item.

20 Claims, 11 Drawing Sheets

(51) Int. Cl.
*H04N 21/235* (2011.01)
*H04N 21/478* (2011.01)
*H04N 21/81* (2011.01)

(58) Field of Classification Search
USPC .......................................................... 725/23
See application file for complete search history.

(56) References Cited

U.S. PATENT DOCUMENTS

| | | | |
|---|---|---|---|
| 7,095,402 B2 | 8/2006 | Kunii et al. | |
| 7,100,187 B2 | 8/2006 | Pierzga et al. | |
| 7,233,316 B2 | 6/2007 | Smith et al. | |
| 7,594,255 B2 | 9/2009 | Yamamoto et al. | |
| 7,640,562 B2 | 12/2009 | Bouilloux-Lafont et al. | |
| 7,836,475 B2 | 11/2010 | Angiolillo et al. | |
| 8,065,708 B1 | 11/2011 | Smyth et al. | |
| 8,196,174 B2 | 6/2012 | Piepenbrink et al. | |
| 8,234,386 B2 * | 7/2012 | Collet | H04N 21/25891 709/227 |
| 8,495,671 B1 | 7/2013 | Ribeiro et al. | |
| 8,601,394 B2 | 12/2013 | Sheehan et al. | |
| 8,666,528 B2 * | 3/2014 | Harkness | H04H 20/31 700/94 |
| 8,799,944 B2 | 8/2014 | Angiolillo et al. | |
| 8,831,405 B2 * | 9/2014 | Miyake | H04N 21/4344 386/248 |
| 8,893,178 B2 | 11/2014 | Bennington et al. | |
| 9,135,645 B2 | 9/2015 | Yates | |
| 9,137,576 B2 | 9/2015 | McRae | |
| 9,467,750 B2 | 10/2016 | Banica et al. | |
| 9,537,920 B2 | 1/2017 | Tarbox et al. | |
| 9,723,374 B2 | 8/2017 | Abramson et al. | |
| 9,918,135 B1 * | 3/2018 | Truong | H04N 21/4784 |
| 2002/0162120 A1 * | 10/2002 | Mitchell | H04N 7/165 725/135 |
| 2003/0018976 A1 * | 1/2003 | Wasilewski | G06Q 20/0855 725/110 |
| 2003/0169286 A1 | 9/2003 | Misawa | |
| 2004/0164973 A1 | 8/2004 | Nakano et al. | |
| 2004/0268387 A1 * | 12/2004 | Wendling | H04N 5/4401 725/35 |
| 2005/0010955 A1 | 1/2005 | Elia et al. | |
| 2005/0192924 A1 | 9/2005 | Drucker et al. | |
| 2006/0037037 A1 | 2/2006 | Miranz | |
| 2007/0094688 A1 | 4/2007 | Briscoe | |
| 2007/0107019 A1 | 5/2007 | Romano et al. | |
| 2007/0130585 A1 | 6/2007 | Perret et al. | |
| 2007/0199040 A1 | 8/2007 | Kates | |
| 2007/0250901 A1 | 10/2007 | McIntire et al. | |
| 2008/0163290 A1 | 7/2008 | Marko | |
| 2009/0037951 A1 | 2/2009 | Candelore et al. | |
| 2009/0238536 A1 | 9/2009 | Gratton | |
| 2009/0307719 A1 | 12/2009 | Clark et al. | |
| 2010/0017523 A1 | 1/2010 | Yoshiuchi | |
| 2010/0141851 A1 | 6/2010 | Kendall | |
| 2010/0281506 A1 | 11/2010 | Schmidt et al. | |
| 2011/0066942 A1 | 3/2011 | Barton et al. | |
| 2011/0078724 A1 | 3/2011 | Mehta et al. | |
| 2011/0179451 A1 | 7/2011 | Miles et al. | |
| 2011/0179453 A1 | 7/2011 | Poniatowski | |
| 2011/0213670 A1 | 9/2011 | Strutton et al. | |
| 2011/0271296 A1 * | 11/2011 | Tu | H04N 5/44543 725/25 |
| 2012/0054618 A1 | 3/2012 | Ames | |
| 2012/0110235 A1 | 5/2012 | Hsieh et al. | |
| 2012/0246683 A1 | 9/2012 | Mohammed et al. | |
| 2012/0272256 A1 | 10/2012 | Bedi | |
| 2013/0007815 A1 * | 1/2013 | Jackson | H04N 21/234 725/63 |
| 2013/0111347 A1 | 5/2013 | Reilly et al. | |
| 2013/0132999 A1 * | 5/2013 | Pandey | H04N 21/4221 725/35 |
| 2013/0276030 A1 | 10/2013 | Fujimoto | |
| 2014/0053191 A1 | 2/2014 | Selim | |
| 2014/0053213 A1 | 2/2014 | Ueda et al. | |
| 2014/0071232 A1 | 3/2014 | Tsukagoshi et al. | |
| 2014/0123183 A1 | 5/2014 | Fujimoto et al. | |
| 2014/0372876 A1 | 12/2014 | Bliss et al. | |
| 2015/0113571 A1 * | 4/2015 | Cholas | H04N 21/4622 725/59 |
| 2015/0172785 A1 | 6/2015 | Oh et al. | |
| 2015/0215133 A1 | 7/2015 | Cao et al. | |
| 2015/0281781 A1 * | 10/2015 | Kitazato | H04N 21/23614 725/32 |
| 2015/0319505 A1 | 11/2015 | Patadia et al. | |
| 2015/0381692 A1 | 12/2015 | Giladi et al. | |
| 2016/0080800 A1 | 3/2016 | Casagrande | |
| 2016/0127776 A1 | 5/2016 | Zilberstein et al. | |
| 2016/0155477 A1 | 6/2016 | Hughes | |
| 2016/0227260 A1 | 8/2016 | Hundemer et al. | |
| 2016/0330508 A1 | 11/2016 | Newell et al. | |
| 2017/0150190 A1 | 5/2017 | Tarbox et al. | |

\* cited by examiner

SINGLE BUTTON SELECTION TO FACILITATE ACTIONS IN A COMMUNICATIONS NETWORK

RELATED APPLICATION

The subject patent application is a continuation of, and claims priority to, U.S. patent application Ser. No. 15/426,545 (now U.S. Pat. No. 9,918,135), filed Feb. 7, 2017, and entitled "SINGLE BUTTON SELECTION TO FACILITATE ACTIONS IN A COMMUNICATIONS NETWORK," the entirety of which application is hereby incorporated by reference herein.

TECHNICAL FIELD

This disclosure relates generally to the field of mobile communication and, more specifically, to, single button selection to facilitate actions in a communications network.

BACKGROUND

As communication networks evolve, various communications devices are used to view streaming content (e.g., a movie, a video) and related content. If a viewer is interested in the streaming content or its related content, the viewer then later, or through another device interface, searches for the streaming content or its related content. This can be inconvenient for the viewer and can result in the viewer not having the opportunity to consume the related content.

BRIEF DESCRIPTION OF THE DRAWINGS

Various non-limiting embodiments are further described with reference to the accompanying drawings in which.

DETAILED DESCRIPTION

Figure 1:
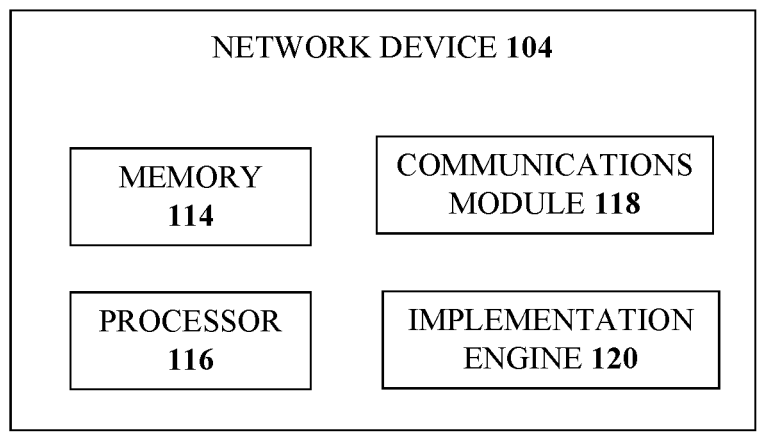
FIG. 1 illustrates an example, non-limiting communications system for providing single button selection to facilitate actions in a communications network in accordance with one or more embodiments described herein.
Figure 1:
Figure 1:
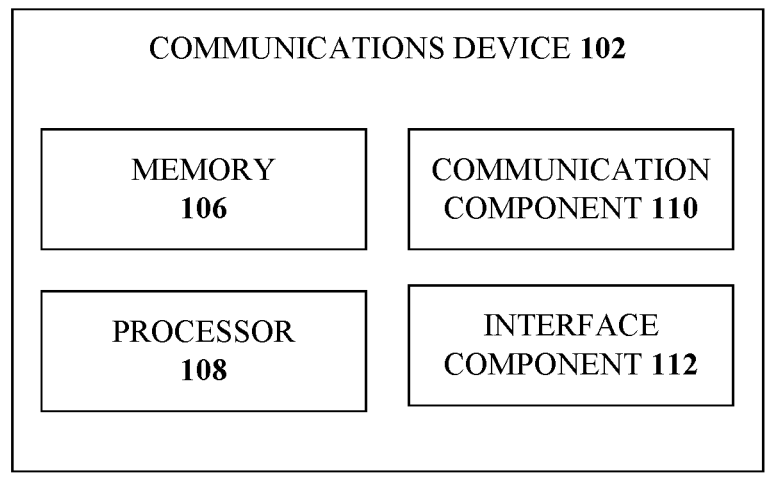

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure can be embodied in many different forms and should not be construed as limited to the example embodiments set forth herein.

Described herein are systems, methods, articles of manufacture, and other embodiments or implementations that can facilitate customization of multimedia content streams. In one embodiment, described herein is a method that can comprise facilitating, by a network device of a wireless network and comprising a processor, a first transmission of a multimedia content stream to a communications device. The multimedia content stream can comprise a main content item and a supplemental content item that supplements the main content item. The supplemental content item can be renderable for consumption at a same time as the main content item when the multimedia content stream is displayed by the communications device. The method can also comprise in response to a request from the communications device for additional information related to the supplemental content item, facilitating, by the network device, a second transmission, to the communications device, of data that comprises the additional information. Based on an indication, received from the communications device, of an acceptance of the data related to the supplemental content item, the method can comprise facilitating, by the network device, an action related to the supplemental content item. The indication can be received during the consumption of the main content item of the multimedia content stream.

In an example, the action is a first action, and facilitating the first action can comprise transmitting, by the network device, a notification to a device associated with a defined identity. The notification can comprise the acceptance of the data related to the supplemental content item. In response to receipt of a communication from the device, the method can comprise facilitating, by the network device, a second action related to the supplemental content item.

The main content item can be a first content item and the supplemental content item can be a second content item. The communication from the device can be a denial of the acceptance of the data related to the supplemental content item. The method can further comprise facilitating, by the network device, a third transmission of the denial to the communications device to be output at the communications device during the consumption of the first content item or a third content item.

In a further example, the communication from the device can be an approval of the acceptance of the data related to the supplemental content item. The method can further comprise facilitating, by the network device, a third transmission of the approval to the communications device and facilitating, by the network device, a delivery of the supplemental content item to the communications device or to a defined location other than where the communications device is determined to be. Further to this example, the supplemental content item can be associated with a physical object and the defined location can be a delivery location for the physical object.

In another example, facilitating the first transmission of the data related to the supplemental content item can comprise facilitating the first transmission of an incentive associated with the action related to the supplemental content item. The incentive can comprise a defined interval for the action. The method can also include terminating availability of the incentive after expiration of the defined interval. Further to this example, the supplemental content item can relate to a product and the incentive can be a price reduction for a purchase of the product.

According to an aspect, the indication from the communications device can be a request to place the data related to the supplemental content item in a queue. Facilitating the action can comprise storing the data related to the supplemental content item in a storage device accessible by the communications device. Further to this aspect, the action can be a first action, and the method can further comprise determining, by the network device, an expiration of a defined interval after the data related to the supplemental content item is retained in the storage device. The method can also comprise facilitating, by the network device, an output of the data related to the supplemental content item by the communications device and facilitating, by the network device, a second action related to the supplemental content item. Further to this aspect, facilitating the second action can comprise removing the data related to the supplemental content item from the storage device. Additionally or alternatively, the supplemental content item can be associated with a physical object and facilitating the second action can comprise facilitating a delivery of the physical object to a defined location.

In accordance with some implementations, the data can be first data, the supplemental content item can be a first supplemental content item, the indication can be a first indication, the acceptance can be a first acceptance, and the first acceptance of the first data related to the first supplemental content item can comprise the first indication of an interest in the first supplemental content item. The method can comprise facilitating, by the network device, a third transmission of second data related to a second supplemental content item to be output at the communications device. The second supplemental content item can be renderable for the consumption at the same time as the main content item when the multimedia content stream is displayed by the communications device. In response to a second indication, from the communications device, of a second acceptance of the second data related to the second supplemental content item, the method can comprise facilitating, by the network device, a second action related to the second supplemental content item. The second indication can be received during the consumption of the main content item.

According to another embodiment, a system can comprise a processor and a memory that stores executable instructions that, when executed by the processor, facilitate performance of operations. The operations can comprise facilitating output of a multimedia content stream at a communications device. The multimedia content stream can comprise a main content item and a message. In response to a request for supplementary information related to the message, the operations can comprise facilitating, at the communications device, an output of data that comprises the supplementary information. The data and the main content item can be consumed concurrently at the communications device. In response to receipt of an indication of an acceptance request of the data related to the message, the operations can comprise facilitating an action related to the message.

According to an implementation, the operations can comprise transmitting, to a device of an identified entity, a notification comprising the acceptance request of the data related to the message. The operations can also comprise, in response to receipt of a denial from the device of the identified entity, facilitating output of the denial of the acceptance request at the communications device.

In an example, the message can comprise an advertisement of a physical object. The operations further can comprise transmitting, to a device of an identified third-party entity, a notification comprising the acceptance request of the data related to the message. In response to receipt of an approval of the acceptance request from the device of the identified third-party entity, the operations can comprise facilitating output of the approval at the communications device. The operations can also comprise facilitating delivery of the physical object to a location defined by an entity associated with the communications device.

According to an example, the action can comprise provision of an incentive associated with a completion of the acceptance request within a defined time interval. In another example, the operations can comprise, based on a determination that the defined time interval has expired, facilitating, at the communications device, an additional output of the data related to the message.

According to yet another embodiment, described herein is a machine-readable storage medium comprising executable instructions that, when executed by a processor, facilitate performance of operations. The operations can comprise outputting a multimedia content stream that can comprise a main content item and a message not related to the main content item. In response to an indication of interest in the message, the operations can comprise outputting data that comprises content of the message. The content can be output concurrently with the main content item. In response to an acceptance of the data, the operations can comprise transmitting information related to the acceptance to a device associated with an identity. Based on a response received from the device being determined to be a denial of the acceptance, the operations can comprise facilitating output of the denial. Further, the operations can comprise, based on the response received from the device being determined to be an approval of the acceptance, facilitating a delivery of the content of the message.

In an example, the operations further comprise, based on the denial of the acceptance, discontinuing output of subsequent messages included in the multimedia content stream during the output of the main content item. Alternatively or additionally, the operations can comprise completing a transaction for purchase of the physical object and facilitating the delivery of the physical object to a location identified in transaction information associated with the transaction.

Referring initially to FIG. 1 illustrated is an example, non-limiting communications system 100 for providing single button selection to facilitate actions in a communications network in accordance with one or more embodiments described herein.

The non-limiting communications system 100 can include a communications device 102 and a network device 104. The network device 104 can be included in a group of network devices of a wireless network. Although only a single communications device and a single network device are shown and described, the various aspects are not limited to this implementation. Instead, multiple communications devices and/or multiple network devices can be included in a communications system.

The communications device 102 can include a memory 106, a processor 108, a communication component 110, and an interface component 112. The memory 106 can be operatively connected to the processor 108. The memory 106 can store executable instructions that, when executed by the processor 108 facilitate performance of operations. Further, the processor 108 can be utilized to execute computer executable components stored in the memory 106.

For example, the memory 106 can store protocols associated with consumption of multimedia content streams that includes a main content item and one or more supplemental content items. The supplemental content items can comprise messages. The main content item and the one or more supplemental content items can be rendered on the communications device 102 at about the same time, or at different times. For example, a first portion of the main content item can be rendered on the communications device, followed by a first supplemental content item, a second portion of the main content item, a second supplemental content item, a third portion of the main content item, a third supplemental content item, and so on.

Further, the memory 106 can facilitate action to control communication between the communications device 102 and the network device 104 such that the non-limiting communications system 100 can employ stored protocols and/or algorithms to achieve improved communications in a wireless network as described herein. According to some implementations, the communication component 110 can facilitate communications between an identified entity associated with the communications device 102 (e.g., an owner of the communications device 102, a user of the communications device 102, and so on).

The communication component 110, for example, can be a transmitter/receiver configured to transmit to and/or receive data from the network device 104, other network devices, and/or other mobile devices. Through the communication component 110, the communications device 102 can concurrently transmit and receive data, can transmit and receive data at different times, or combinations thereof. The interface component 112 can output one or more recommendations and/or one or more multimedia streams at the communications device 102, as discussed herein.

The network device 104 can include a memory 114, a processor 116, a communications module 118, and an implementation engine 120. The memory 114 can be operatively connected to the processor 116. The memory 114 can store executable instructions that, when executed by the processor 116 facilitate performance of operations. Further, the processor can be utilized to execute computer executable components stored in the memory 114.

The memory 114 can store protocols associated with single button selection to facilitate actions in a communications network as discussed herein. Further, the memory 114 can facilitate action to control communication between the network device 104 and the communications device 102 such that the non-limiting communications system 100 can employ stored protocols and/or algorithms to achieve improved communications in a wireless network as described herein.

According to some implementations, the communications module 118 can facilitate communications between the identified entity associated with the communications device 102. Further, the communications module 118 can facilitate communication with the communications device 102, other network devices, and/or other mobile devices.

The implementation engine 120 can facilitate execution of one or more actions related to supplemental content items that can be output within the multimedia content stream. For example, the main content item can be videos that can be displayed at the communications device 102 and the supplemental content items can be advertisements. The implementation engine 120 can allow the identified entity to, with a single button or another manner of selection on the communications device 102 (e.g., through the interface component 112), purchase a product, obtain more information about the product, or perform another action with respect to the supplemental content item. The implementation engine 120 can facilitate the purchase without the need to direct the identified entity to another website. Further, according to some implementations, the desire by the identified entity to purchase an item can be monitored by a third party, such as a friend that can help to stop purchases of a compulsive shopper, for example. According to some implementations, incentives to purchase the item can be provided as additional supplemental content. Further, to delay a purchase, data related to one or more supplemental items can be stored for later output.

According to some implementations, more than one communications device can be associated with the identified entity. For example, the identified entity can utilize two or more communications devices (e.g., a mobile phone, a laptop computer, an Internet of Things (IoT) device, and so on), which can be determined to be associated with the identified entity. Thus, the non-limiting communications system 100 can be configured to monitor interactions across all associated communications devices and facilitate output of the multimedia content stream at one or more of the communications devices.

The respective memories 106, 114 can store respective protocols associated with single button selection to facilitate actions in a communications network, taking action to control communication between the communications device 102 and the network device 104, such that the non-limiting communications system 100 can employ stored protocols and/or algorithms to achieve improved communications in a wireless network as described herein. It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 108, 116 can facilitate respective analysis of information related to supplemental content output during a multimedia content stream in a communication network. The processors 108, 116 can be processors dedicated to analyzing and/or generating information received, a processor that controls one or more components of the non-limiting communications system 100, and/or a processor that both analyzes and generates information received and controls one or more components of the non-limiting communications system 100.

Further, the term network device (e.g., network node, network node device) is used herein to refer to any type of network node serving a communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 104) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

In a specific example, as a customer is watching content on television or on another communications device, the content may pause for an advertisement slot (e.g., advertisement time). If the customer is interested in the content (e.g., product, service) of the advertisement, with the various aspects disclosed herein, the customer can be provided the ability to click on a button on a remote control (or the communications device) and perform an action with respect to the advertised item.

For example, if the advertisement is for a movie, a search can be performed based on the customer's selection and indications as to how to view the movie can be output to the identified entity. For example, a prompt can be output that indicates the movie is available and a confirmation that the customer would like to purchase/view the movie. If there is a cost to watch the movie (e.g., a pay per view), the customer can be advised that in order to watch the movie it will cost x number of dollars. If the movie content has already been prerecorded into the customer's device (e.g., communications device), the customer can be advised that the movie is already available and, if desired, the customer can watch the content immediately or at another time. If the movie is a future release, the customer can place data related to the movie in a future view list and, upon or after the movie is available, another output can be provided to the customer indicating the movie is now available for purchase/consumption.

In another example, if the advertisement is for a vehicle (or another product and/or service), the customer can select the advertisement and a list of available dealers in the area can be provided. According to some implementations, one or more of the available dealers can be provided the customer's information, depending on the preferences of the customer.

In another example, the identified entity might be watching a program, such as a football game, and can be presented with an advertisement for a product. A widget, icon, or other item may be output, as an overlay on the program. The widget can provide an opportunity for the identified entity to obtain additional information and can allow the identified entity to perceive a webpage or different advertisement. Thus, there can be an application executing in a background of the computing device that can facilitate one or more aspects discussed herein. Further, information can be pushed to the communications device from one or more network devices.

Figure 2:
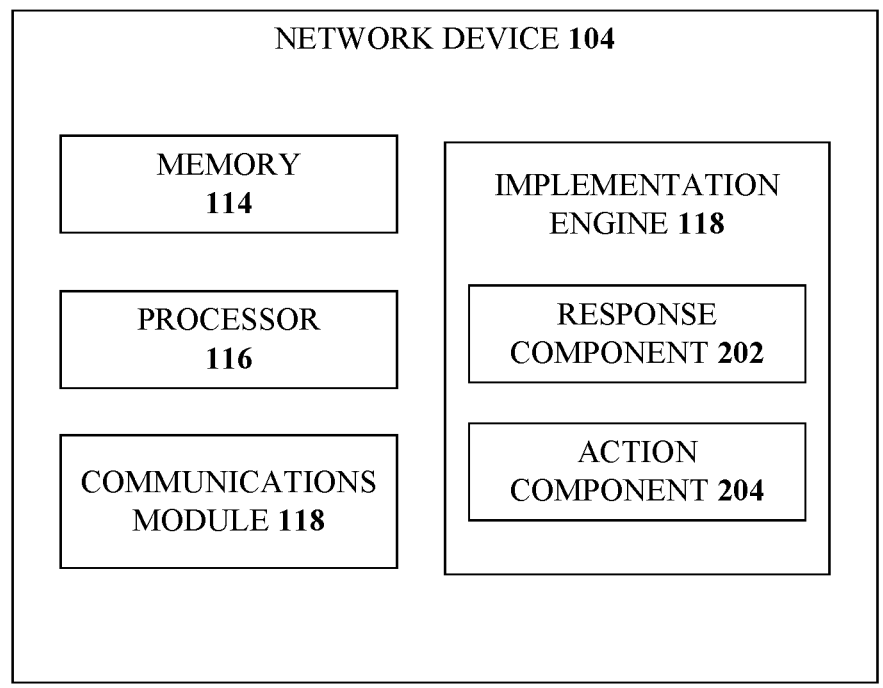
FIG. 2 illustrates an example, non-limiting communications system for outputting multimedia content streams and initiating an action based on interest in at least one supplemental content item of a multimedia content stream in accordance with one or more embodiments described herein.
Figure 2:
Figure 2:
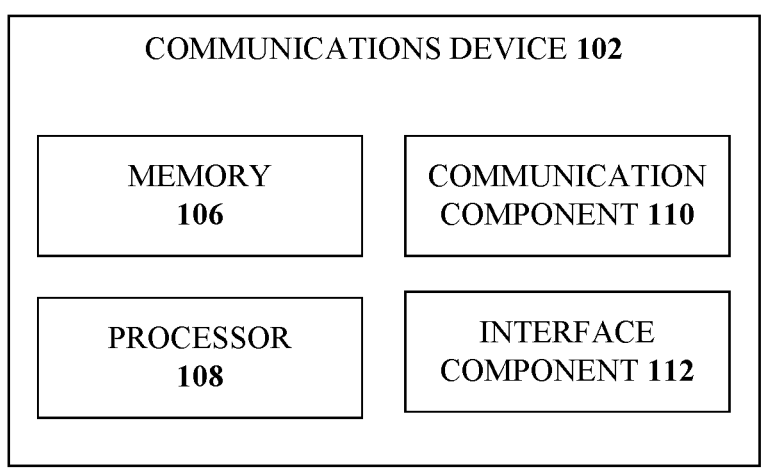

FIG. 2 illustrates an example, non-limiting communications system 200 for outputting multimedia content streams and initiating an action based on interest in at least one supplemental content item of a multimedia content stream in accordance with one or more embodiments described herein. Repetitive description of like elements employed in other embodiments described herein is omitted for sake of brevity. The non-limiting communications system 200 can comprise one or more of the components and/or functionality of non-limiting communications system 100, and vice versa.

The non-limiting communications system 200 can include a response component 202 and an action component 204. The communications module 118 can facilitate output of at least one multimedia content stream at the communications device 102. The at least one multimedia content stream can comprise a main content item and a supplemental content item that supplements the main content item. For example, the main content item can be a movie and the supplemental content can be a message or an advertisement for another movie, a product, a service, or another item that can be advertised.

Upon or after facilitating the output of the message at the communications device, a request for supplementary information related to the message can be received at the communications module 118. For example, as the identified entity is consuming (e.g., watching) the main content item at the communications device 102, the message can be output. If the identified entity is interested in the message, the identified entity can interact with the interface component 112. For example, the identified entity can be presented with a selection button that allows the identified entity to request additional information. According to an implementation, the selection button can be a physical button located on the communications device 102. However, according to other implementations, the selection button can be electronic selection, such as on a display screen or based on an audio input received through a microphone of the communications device 102. For example, circuitry to produce the audio can be included on a motherboard or sound card, connected to a set of external speakers or headphones.

Based on the request for supplementary information, the response component 202 can facilitate, at the communications device 102, an output of data that comprises the supplementary information. According to some implementations, the data and the main content item can be consumed concurrently at the communications device 102. For example, the identified entity can perceive both the main content item and the data at substantially the same time. Further, the identified entity does not have to go to a separate website to perceive the data.

If the identified entity is interested in the data, the identified entity can interact with the communications device 102 (e.g., via the interface component 112) and an indication of an acceptance of the data related to the message can be received at the communications module 118. In response to the indication, the action component 204 can facilitate an action related to the message. According to an implementation, the action can include requesting approval from a third-party entity. According to another implementation, the action can include facilitating delivery of a physical object, related to the supplemental content item, to a defined location.

Figure 3:
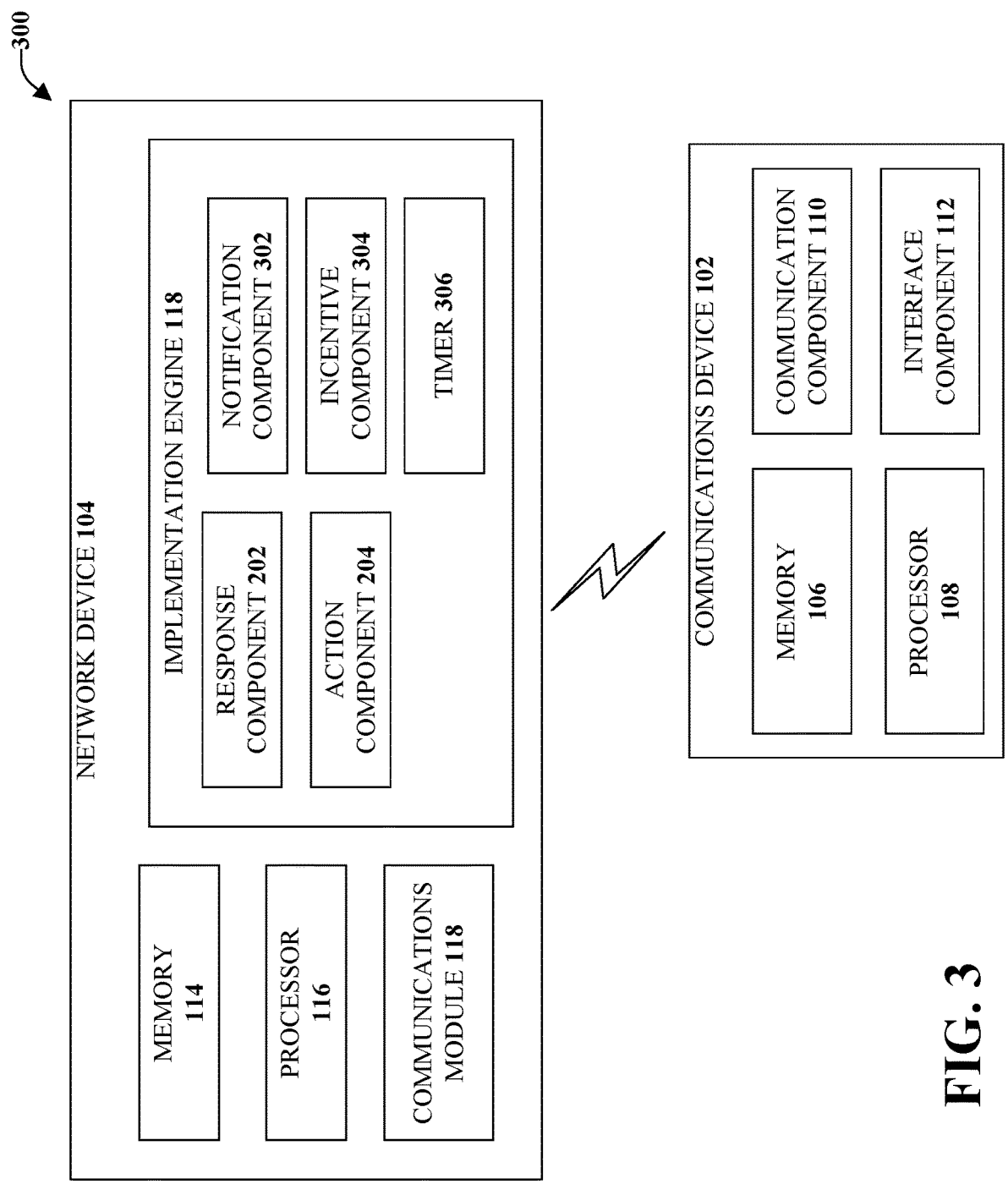
FIG. 3 illustrates an example, non-limiting communications system for obtaining approval confirmation related to a supplemental content item in accordance with one or more embodiments described herein.

FIG. 3 illustrates an example, non-limiting communications system 300 for obtaining approval confirmation related to a supplemental content item in accordance with one or more embodiments described herein. Repetitive description of like elements employed in other embodiments described herein is omitted for sake of brevity. The non-limiting communications system 200 can comprise one or more of the components and/or functionality of non-limiting communications system 100, and/or non-limiting communications system 200, and vice versa.

The non-limiting communications system 300 can include a notification component 302, an incentive component 304, and a timer 306. The acceptance request of the data related to the message can be a request to purchase the item identified in the message. There can be times when the purchase of the item should be approved by a third-party entity. For example, a couple can decide that purchases over a defined dollar amount should be approved by both spouses. In this case, if a husband provides the acceptance request, a notification should be sent to the wife for approval of the acceptance request. In another example, the identified entity can have a tendency to purchase more items than would be beneficial considering budget constraints of the identified entity. In this case, the identified entity can specify one or more third-party entities that he would like to approve the purchase, in an attempt to limit the amount of purchases being made. In another example, the identified entity could be making a purchase for a company and, therefore, a third-party entity at the company could be notified before purchases are made on behalf of the company.

To provide the notifications to the one or more third-party entities, the notification component 302 can transmit, to a device associated with a third-party entity, a notice that can comprise the acceptance request of the data related to the message. The notification component 302 can facilitate output of the notice at another computing device associated with the third-party entity. The third-party entity can either accept the notice or deny the notice. For example, if the third-party entity determines it is okay for the identified entity to purchase the item, the notice can be accepted. However, if the third-party entity determines the identified entity should not purchase the time, the notice can be denied. The approval and/or denial can be input at an interface component associated with the other communications device associated with the third-party entity and can be received at the communications module 118.

In response to receipt of a denial from the device of the identified entity (e.g., via the communications module 118), the notification component 302 can facilitate output of the denial of the acceptance request at the communications device 102. According to an alternative implementation, in response to receipt of an approval of the acceptance request from the device of the identified third-party entity (e.g., via the communications module 118), the notification component 302 can facilitate output of the approval at the communications device 102. Further to this implementation, the action component 204 can facilitate delivery of the item (e.g., physical object) to a location defined by an entity associated with the communications device 102. According to some implementations, the location can be identified in transaction information associated with a transaction that includes the item.

According to some implementations, the incentive component 304 can facilitate output, at the communications device 102, one or more incentives associated with completion of the acceptance request. For example, an incentive can be a discount on a current purchase and/or a future purchase. In another example, an incentive can be related to shipping charges. Another incentive can be the offer of free, or reduced prices, on other items related to the first item associated with the acceptance request. Other incentives can also be provided, which can be generic incentives (e.g., available to all purchasers) or tailored incentives specific for the identified entity.

In some implementations, the incentive might only be available for a limited time. For example, if a purchase is made within the next twelve hours, the incentive can be available and, after twelve hours, the incentive can be withdrawn and/or another incentive can be provided. Thus, the timer 306 can be activated upon or after output of an incentive by the incentive component 304. The timer 306 can be activated for a determined amount of time, which can be specified based on the supplemental content item (e.g., different supplemental content items can be associated with a same amount of time or different amounts of time). After expiration of the timer 306 (e.g., upon or after the time has run out), the incentive can be withdrawn and/or another incentive can be output by the incentive component 304. According to some implementations, the action by the action component 204 can be provision of the incentive associated with completion of the acceptance request within a defined time interval.

Figure 4:
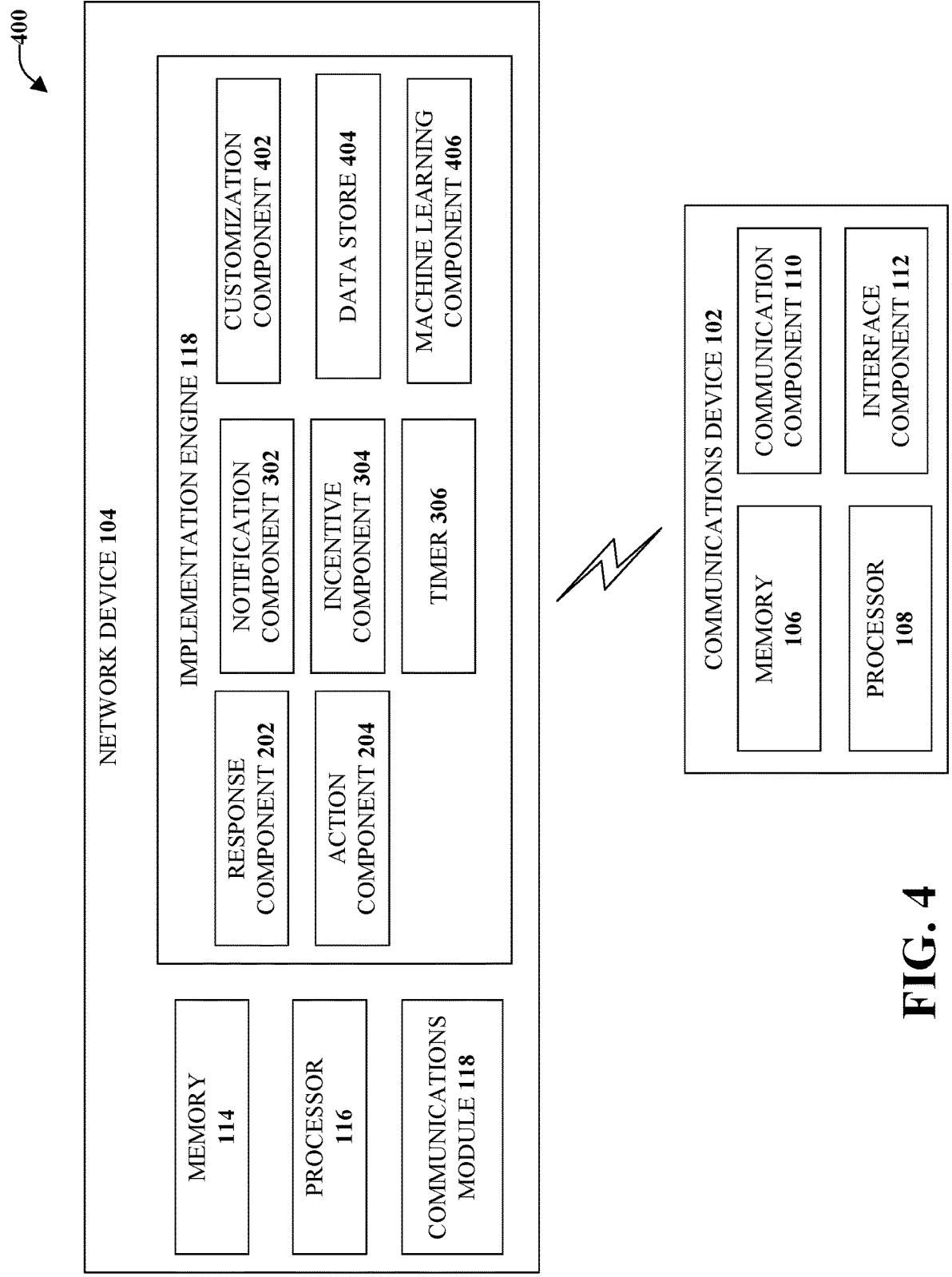
FIG. 4 illustrates an example, non-limiting communications system for providing supplemental content items that can be tailored for an identified entity in accordance with one or more embodiments described herein.

FIG. 4 illustrates an example, non-limiting communications system 400 for providing supplemental content items that can be tailored for an identified entity in accordance with one or more embodiments described herein. Repetitive description of like elements employed in other embodiments described herein is omitted for sake of brevity. The non-limiting communications system 300 can comprise one or more of the components and/or functionality of non-limiting communications system 100, non-limiting communications system 200, and/or non-limiting communications system 300 and vice versa.

The non-limiting communications system 400 can include a customization component 402, a data store 404, and a machine learning component 406. The customization component 402 can tailor or more one supplemental content items or messages based on one or more preference of the identified entity. The one or more preferences can be retained in the data store 404.

For example, upon or after the identified entity accepts first data related to a first supplemental content item, the acceptance can comprise a first indication of an interest in the first supplemental content item. The first indication can be retained in the data store 404. Other indications related to acceptances of other supplemental content items can also be retained in the data store 404 as historical data. The response component 202 can facilitate, at the communications device 102, other outputs of other data that can be related to the content items included in the historical data. The other data can be tailored for the identified entity in order to provide targeted advertisements in accordance with various aspects discussed herein.

Further, in an embodiment, the non-limiting communications system 400 can comprise a machine learning component 406. The machine learning component 406 can perform a set of machine learning computations associated with single button selection to facilitate actions in a communications network. For example, the machine learning component 406 can determine an amount of interest the identified entity has in one or more supplemental content items output within a multimedia content stream, whether one or more similar supplemental content items have been previously output and the identified entity's interest in the similar supplemental content items, and so on. According to another example, the machine learning component 406 can evaluate responses of the identified entity to one or more supplemental content items and facilitate output, at the communications device 102, of one or more supplemental content items targeted for the identified entity. Further, the machine learning component 406 can evaluate interactions of the identified entity based on the one or more supplemental content items targeted for the identified entity of the one or more multimedia content streams and/or the respective weights assigned to the one or more content items and/or the one or more multimedia content streams.

The machine learning component 406 can utilize machine learning systems that have been explicitly or implicitly trained to learn, determine or infer identified entity interests, content items associated with the interests, multimedia content streams that include one or more of the content items (e.g., supplemental content item), identified entity input related to one or more recommendations, and modifications to recommendations based on the input and/or other interactions related to the supplemental content items. It is to be appreciated that machine learning systems can be implemented in one or more of the components to generate explicitly and/or implicitly trained models that provide the recommendation outputs that can be determined to be of interest to the identified entity. The machine learning systems can learn systems, networks, etc., identify interests of the identified entity, respective preferences of the identified entity, and so on in order to determine or infer one or more supplemental content items that should be recommended to the identified entity.

According to some implementations, the interface component 112 (or respective interface components of the one or more computing devices as well as other interface components discussed herein) can provide a graphical user interface (GUI), a command line interface, a speech interface, Natural Language text interface, and the like. For example, a Graphical User Interface (GUI) can be rendered that provides a user with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the user did want the action performed.

The user can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (EGA)) with limited graphic support, and/or low bandwidth communication channels.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
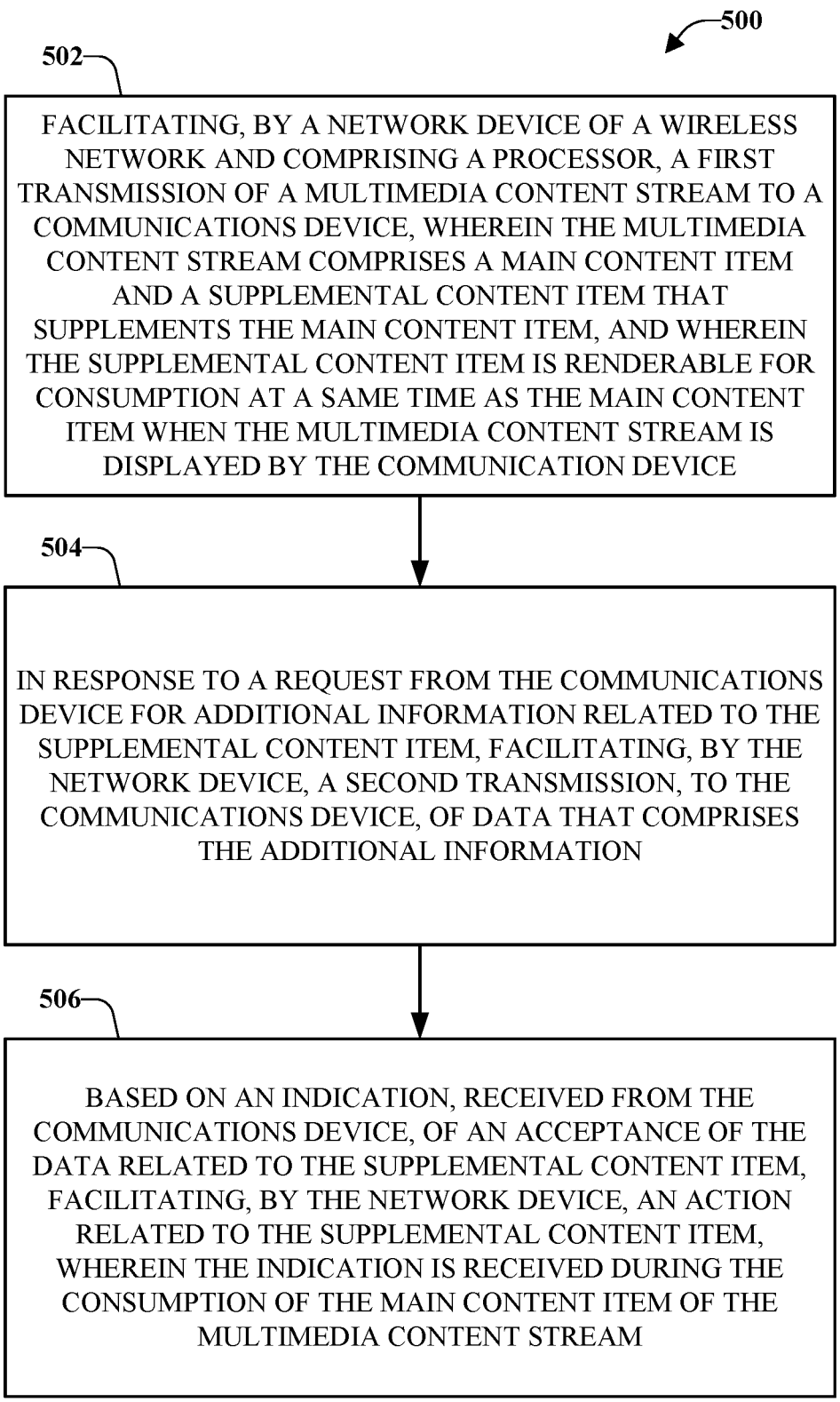
FIG. 5 illustrates a flow diagram of an example, non-limiting computer-implemented method for providing a single button selection to facilitate actions in a communications network in accordance with one or more embodiments described herein.

FIG. 5 illustrates a flow diagram of an example, non-limiting computer-implemented method 500 for providing a single button selection to facilitate actions in a communications network in accordance with one or more embodiments described herein. The non-limiting computer-implemented method 500 begins at 502 with facilitation, by a network device of a wireless network and comprising a processor, a first transmission of a multimedia content stream to a communications device (e.g., via the communications module 118). The multimedia content stream can comprise a main content item and a supplemental content item that supplements the main content item. The supplemental content item can be renderable for consumption at a same time as the main content item when the multimedia content stream is displayed by the communication device.

In response to a request from the communications device for additional information related to the supplemental content item, at 504, facilitate, by the network device, a second transmission, to the communications device, of data that comprises the additional information (e.g., via the response component 202). Based on an indication, received from the communications device, of an acceptance of the data related to the supplemental content item, at 506, facilitate, by the network device, an action related to the supplemental content item (e.g., via the action component 204). The indication can be received during the consumption of the main content item of the multimedia content stream.

According to an implementation, the supplemental content item can be an advertisement. Further to this implementation, facilitating transmission of the data related to the supplemental content item can comprise facilitating the first transmission of an incentive associated with the action related to the supplemental content item. The incentive can comprise a defined interval for the action. The non-limiting computer-implemented method 500 can also include terminating availability of the incentive after expiration of the defined interval. For example, the incentive can be a discount or other incentive related to the supplemental content item (e.g., free shipping, financing terms, and so on) that is only available for a limited time, after which the incentive can change or might no longer be offered. In an example, the supplemental content item can relate to a product and the incentive can be a price reduction for a purchase of the product.

Figure 6:
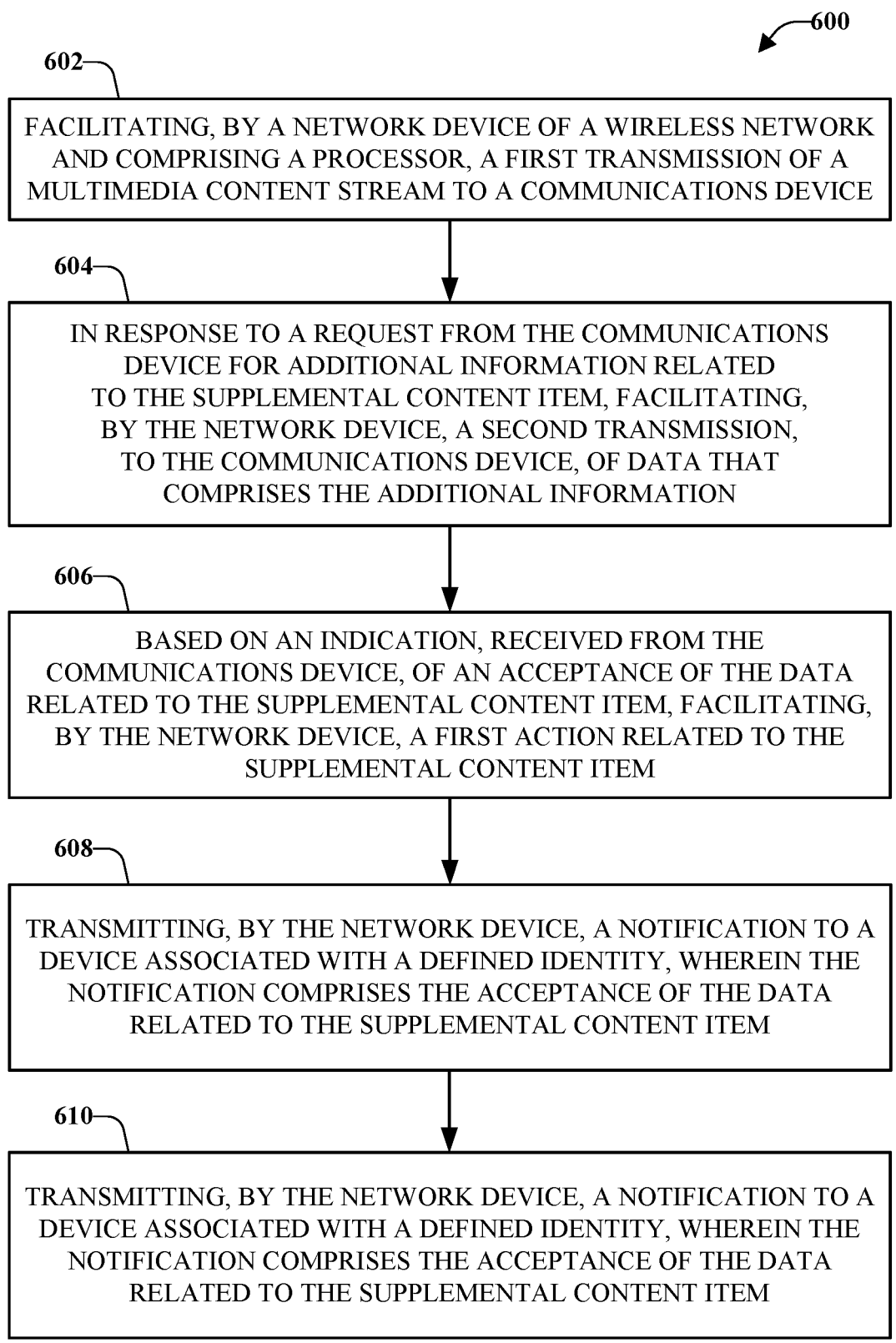
FIG. 6 illustrates a flow diagram of an example, non-limiting computer-implemented method for responding to one or more requests based on a single button selection in accordance with one or more embodiments described herein.

FIG. 6 illustrates a flow diagram of an example, non-limiting computer-implemented method 600 for responding to one or more requests based on a single button selection in accordance with one or more embodiments described herein. At 602, facilitate, by a network device of a wireless network and comprising a processor, a first transmission of a multimedia content stream to a communications device (e.g., via the communications module 118). The multimedia content stream can comprise a main content item and a supplemental content item. In response to a request from the communications device for additional information related to the supplemental content item, at 604, facilitate, by the network device, a second transmission, to the communications device, of data that comprises the additional information (e.g., via the response component 202). Further, based on an indication, received from the communications device, of an acceptance of the data related to the supplemental content item, at 606, facilitate, by the network device, a first action related to the supplemental content item (e.g., via the action component 204).

To facilitate the first action, the non-limiting computer-implemented method 600 can also include, at 606, transmitting, by the network device, a notification to a device associated with a defined identity (e.g., via the notification component 302). The notification can comprise the acceptance of the data related to the supplemental content item. In response to receipt of a communication from the device, at 608, facilitate, by the network device, a second action related to the supplemental content item (e.g., via the action component 204).

According to an implementation, the main content item can be a first content item and the supplemental content item can be a second content item. The communication from the device can be a denial of the acceptance of the data related to the supplemental content item. Further to this implementation, the non-limiting computer-implemented method 600 can comprise facilitating, by the network device, a third transmission of the denial to the communications device to be output at the communications device during the consumption of the first content item or a third content item. For example, the device can be associated with an identified third-party entity that has been selected to confirm the acceptance of the supplemental content stream. The identified third-party entity can be a friend or designated party that monitors consumption by the identified entity associated with communications device. Such overseeing by the identified third-party entity can assist when the identified entity is attempting to control a compulsive spending habit or is attempting to stay within a budget.

Figure 7:
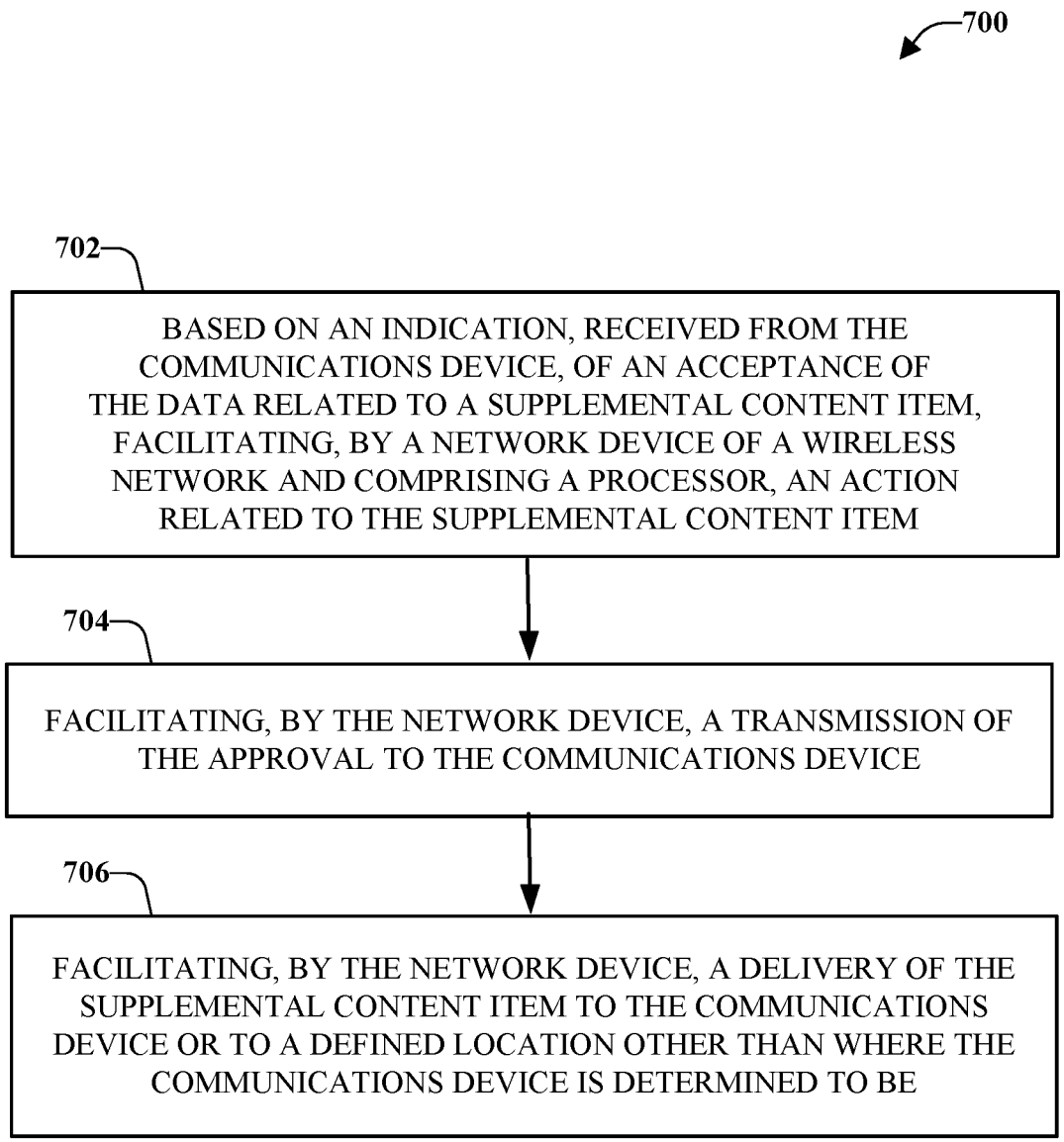
FIG. 7 illustrates a flow diagram of an example, non-limiting computer-implemented method for facilitating delivery of a supplemental content item in response to a request initiated through a single button selection in accordance with one or more embodiments described herein.

FIG. 7 illustrates a flow diagram of an example, non-limiting computer-implemented method 700 for facilitating delivery of a supplemental content item in response to a request initiated through a single button selection in accordance with one or more embodiments described herein. Based on an indication, received from a communications device, of an acceptance of data related to a supplemental content item, at 702, facilitate, by a network device of a wireless network and comprising a processor, an action related to the supplemental content item (e.g., via the action component 204). The supplemental content item can be renderable for consumption at about a same time as a main content item is output at the communications device. The main content item and the supplemental content item can be output as a multimedia content stream.

Upon or after the acceptance of the data related to the supplemental content, a notification can be transmitted to another device associated with a defined entity. If the defined entity denies the acceptance, actions related to the acceptance can be canceled. However, if the defined entity approves the acceptance of the data related to the supplemental content item, at 704, facilitate, by the network device, a transmission of the approval to the communications device (e.g., via the communications module 118). In this manner, the entity associated with the communications device can be aware that the request has been approved. In the case of denial of the acceptance, a notice can also be provided at the communications device so that the entity can be aware that the request was denied.

Based on the approval, at 706, facilitate, by the network device, a delivery of the supplemental content item to the communications device or to a defined location other than where the communications device is determined to be (e.g., via the action component 204). For example, if the supplemental content relates to a physical object, delivery of that physical object to a delivery location can be facilitated without the need for the identified entity to perform another action (e.g., go to a separate website).

Figure 8:
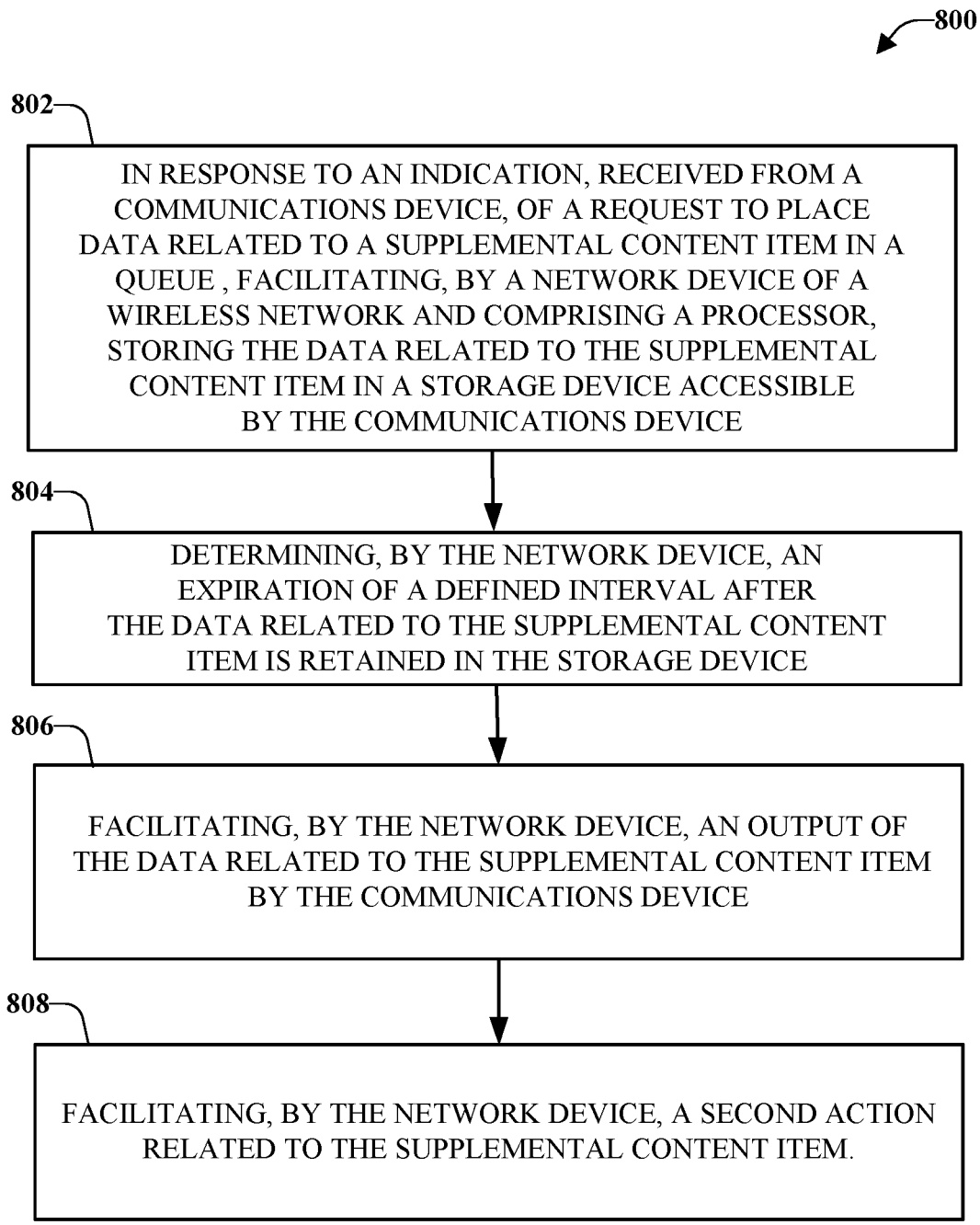
FIG. 8 illustrates a flow diagram of an example, non-limiting computer-implemented method for retaining an indication of an interest in a supplemental content item for later actions in accordance with one or more embodiments described herein.

FIG. 8 illustrates a flow diagram of an example, non-limiting computer-implemented method 800 for retaining an indication of an interest in a supplemental content item for later action in accordance with one or more embodiments described herein. At 802, facilitate, by a network device of a wireless network and comprising a processor, storing the data related to the supplemental content item in a storage device accessible by the communications device (e.g., via the data store 404). Storing the data can be in response to an indication, received from a communications device, of a request to place data related to a supplemental content item in a queue.

At 804, determine, by the network device, an expiration of a defined interval after the data related to the supplemental content item is retained in the storage device (e.g., via the timer 306). For example, upon or after storing the data, a timer can be started to monitor a length of time the data is stored in the queue without action being taken. At 806, facilitate, by the network device, an output of the data related to the supplemental content item by the communications device. For example, the data can be output to remind the entity that the data is being retained in the queue.

Further, at 808, facilitate, by the network device an action related to the supplemental content item (e.g., via the action component 204). According to an implementation, facilitating the action can comprise removing the data related to the supplemental content item from the storage device (e.g., the entity is no longer interested in the supplemental content item). According to another implementation, the supplemental content item can be associated with a physical object. Further to this implementation, facilitating the second action can comprise facilitating a delivery of the physical object to a defined location.

Figure 9:
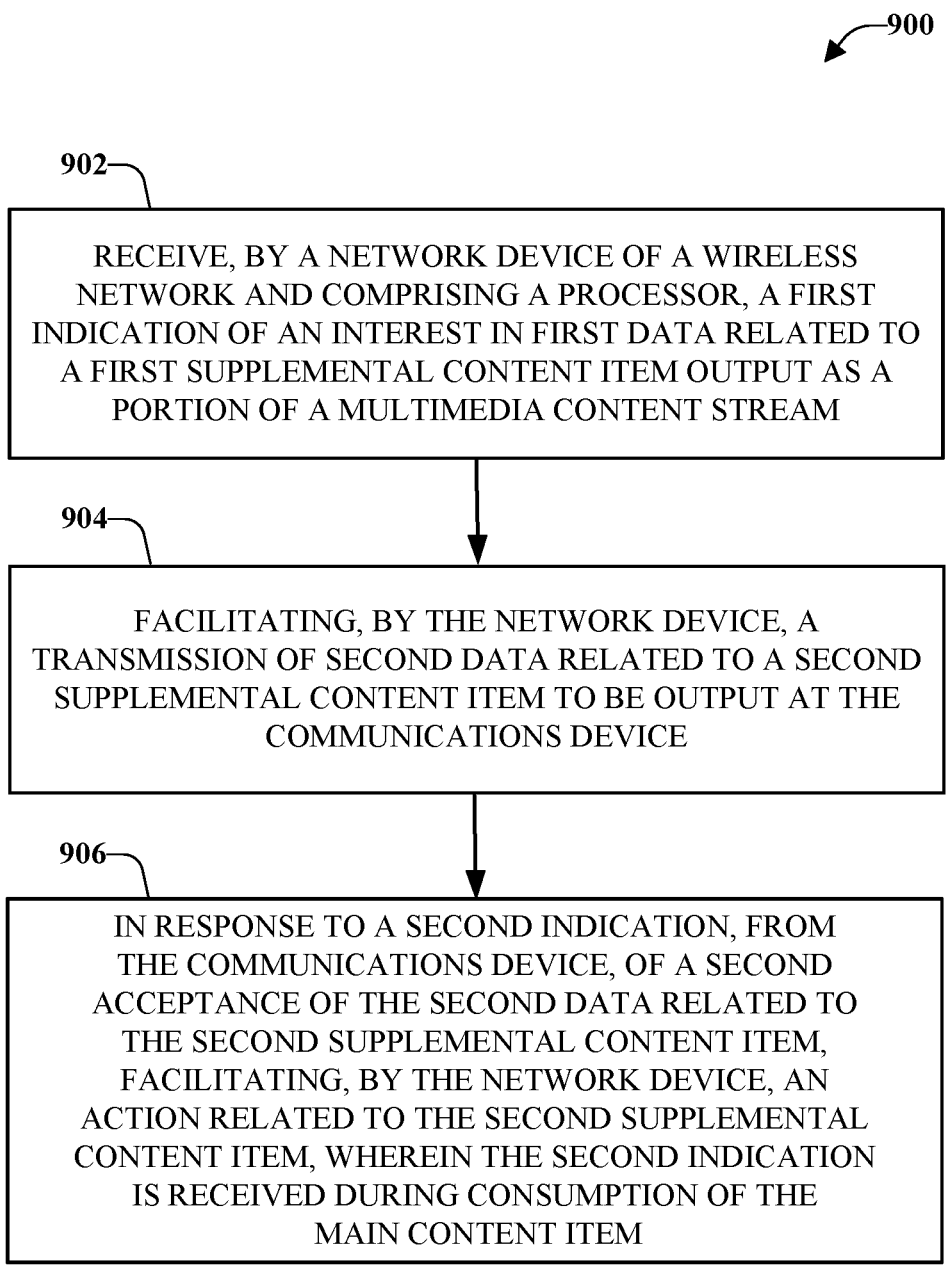
FIG. 9 illustrates a flow diagram of an example, non-limiting computer-implemented method for providing targeted supplemental content items during consumption of a multimedia content stream in accordance with one or more embodiments described herein.

FIG. 9 illustrates a flow diagram of an example, non-limiting computer-implemented method 900 for providing targeted supplemental content items during consumption of a multimedia content stream in accordance with one or more embodiments described herein. At 902, receive, by a network device of a wireless network and comprising a processor, a first indication of an interest in first data related to a first supplemental content item output as a portion of a multimedia content stream (e.g., via the response component 202).

Based on the first indication of the interest, at 904, facilitating, by the network device, a transmission of second data related to a second supplemental content item to be output at the communications device (e.g., via the communications module 118). The second supplemental content item can be renderable for consumption at about the same time as a main content item when the multimedia content stream is displayed by the communication device.

In response to a second indication, from the communications device, of a second acceptance of the second data related to the second supplemental content item, at 906, facilitating, by the network device, an action related to the second supplemental content item. The second indication can be received during the consumption of the main content item (e.g., via the action component 204).

Figure 10:
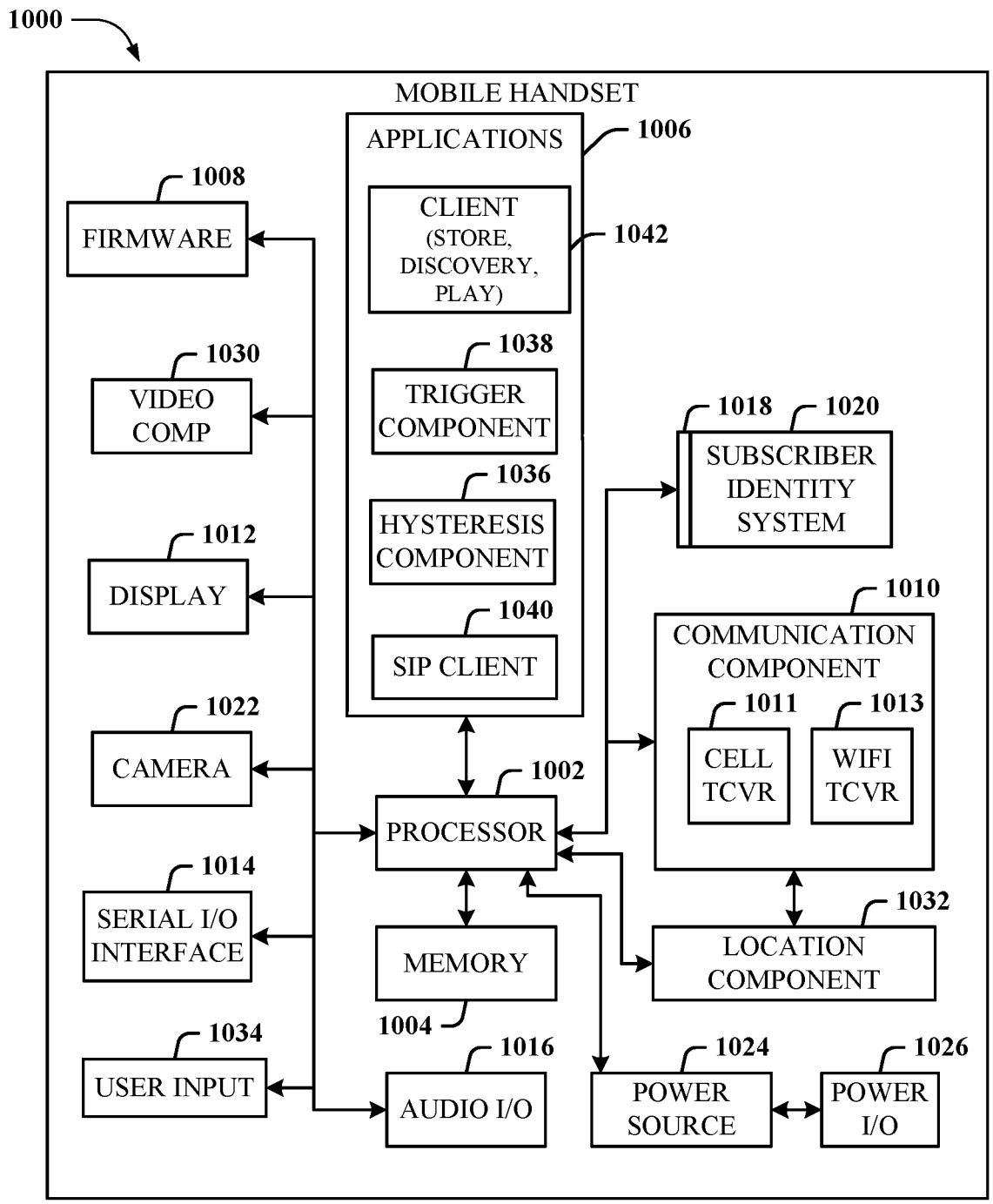
FIG. 10 illustrates an example block diagram of an example mobile handset operable to engage in a system architecture that facilitates wireless communications according to one or more embodiments described herein.

Referring now to FIG. 10, illustrated is a schematic block diagram of an exemplary end-user device such as a mobile device or handset 1000 capable of connecting to a network in accordance with some embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
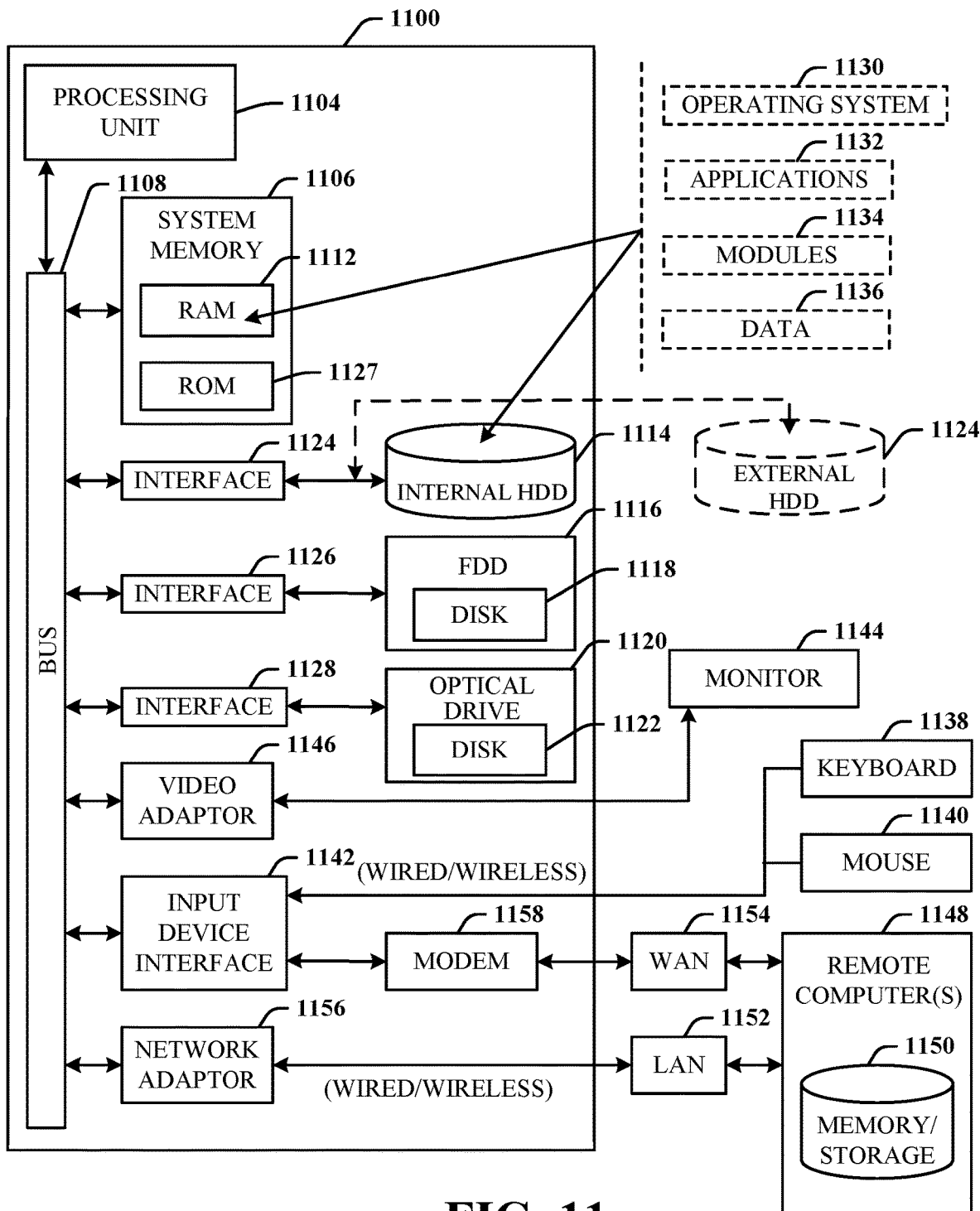
FIG. 11 illustrates an example block diagram of an example computer operable to engage in a system architecture that facilitates wireless communications according to one or more embodiments described herein.

Referring now to FIG. 11, there is illustrated a block diagram of a computer 1100 operable to execute a system architecture that facilitates establishing a transaction between an entity and a third party. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the various embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the exemplary operating environment, and further, that any such media can contain computer-executable instructions for performing the methods of the disclosed embodiments.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the various embodiments can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1100 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As utilized herein, terms "component," "engine," "module," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
in response to a request received from a communication device for data related to a supplemental content item of a multimedia content stream, facilitating an output of the data related to the supplemental content item of the multimedia content stream from the communication device, wherein the supplemental content item is output from the communication device as a portion of the multimedia content stream that comprises a main content item and the supplemental content item that supplements the main content item; and
in response to an indication of an acceptance of the data related to the supplemental content item of the multimedia content stream,
identifying an entity associated with the communication device, resulting in an identified entity; and
facilitating an action tailored for the identified entity and related to the supplemental content item, wherein the facilitating is in an absence of an interaction from the identified entity after the acceptance of the data.

2. The system of claim 1, wherein the operations further comprise receiving the indication of the acceptance during a consumption of the main content item of the multimedia content stream.

3. The system of claim 1, wherein the indication is a first indication, wherein the acceptance is a first acceptance, wherein the data is first data, wherein the supplemental content item is a first supplemental content item, wherein the action is a first action, and wherein the operations further comprise:
facilitating a transmission of second data related to a second supplemental content item output from the communication device; and
in response to a second indication, from the communication device, of a second acceptance of the second data related to the second supplemental content item, facilitating a second action related to the second supplemental content item.

4. The system of claim 3, wherein the second indication is received during a consumption of the main content item of the multimedia content stream.

5. The system of claim 1, wherein the indication is a first indication, and wherein the operations further comprise:
receiving a second indication to position the data related to the supplemental content item in a queue; and
facilitating a storage of the data related to the supplemental content item in a storage device accessible by the communication device.

6. The system of claim 5, wherein the action is a first action, wherein the output of the data is a first output of the data, and wherein the operations further comprise:
determining an expiration of a defined interval after the data related to the supplemental content item is retained in the storage device;
facilitating a second output of the data related to the supplemental content item from the communication device; and
facilitating a second action related to the supplemental content item.

7. The system of claim 1, wherein the supplemental content item is associated with a physical object, and wherein the operations further comprise facilitating a delivery of the physical object to a defined location associated with the communication device.

8. The system of claim 1, wherein the operations further comprise:
prior to the receiving the indication of the acceptance of the data related to the supplemental content item, facilitating a first transmission of the data related to the supplemental content item;
facilitating a second transmission of an incentive associated with the action related to the supplemental content item, wherein the incentive comprises information representative of a defined interval for the action; and
terminating an availability of the incentive after an expiration of the defined interval.

9. The system of claim 8, wherein the incentive is a price reduction for a purchase of a product associated with the supplemental content item.

10. The system of claim 1, wherein the action is a first action, wherein the communication device is a first communication device, and wherein the operations further comprise:
transmitting a notification to a second communication device associated with a defined identity, wherein the notification comprises the indication of the acceptance of the data related to the supplemental content item of the multimedia content stream; and
in response to receipt of an approval from the second communication device, facilitating a second action related to the supplemental content item.

11. A method, comprising:
facilitating, by a wireless network device comprising a processor, an output, at a communication device, of information about a supplemental content associated with a message included in a portion of a first multimedia content stream, wherein the first multimedia content stream comprises a main content item and the message, and wherein the main content item is supplemented by the supplemental content; and
based on receipt of an acceptance of the information about the supplemental content,
identifying, by the wireless network device, an entity associated with the communication device, and
facilitating, by the wireless network device and without directing the entity to a related website, an implementation of an action related to the supplemental content and customized for the entity associated with the communication device.

12. The method of claim 11, further comprising:
receiving, by the wireless network device, the acceptance of the information during a consumption of the main content item of the first multimedia content stream.

13. The method of claim 11, wherein the acceptance comprises a request to schedule the information related to the supplemental content in a queue, and wherein the method further comprises:
   facilitating, by the wireless network device, storage of the information related to the supplemental content in a storage device accessible by the communication device.

14. The method of claim 11, further comprising:
   provisioning, by the wireless network device, an incentive associated with a completion of the acceptance of the information within a defined time interval.

15. The method of claim 14, further comprising:
   based on a determination that the defined time interval has expired, facilitating, by the wireless network device, an additional output of the information related to the message.

16. The method of claim 11, wherein the acceptance is a first acceptance, wherein the information is first information, wherein the supplemental content is first supplemental content, wherein the action is a first action, and wherein the method further comprises:
   facilitating, by the wireless network device, a transmission of second information related to second supplemental content to be output from the communication device; and
   in response to a second indication, from the communication device, of a second acceptance of the second information related to the second supplemental content, facilitating, by the wireless network device, a second action related to the second supplemental content.

17. A non-transitory machine-readable storage medium, comprising executable instructions that, when executed by a processor, facilitate performance of operations, comprising:
   receiving, from a communication device, a request for data related to supplemental information, wherein the supplemental information is output from the communication device as a portion of a multimedia content stream that comprises a main content item and the supplemental information, and wherein the supplemental information supplements the main content item;
   facilitating an output of the data related to the supplemental information;
   receiving, from the communication device, an indication of acceptance of the data related to the supplemental information of the multimedia content stream;
   determining an identity of a user of the communication device, and
   facilitating, without a further interaction from the user, an action related to the supplemental information and tailored to the identity for the user of the communication device.

18. The non-transitory machine-readable storage medium of claim 17, wherein the operations further comprise:
   prior to the receiving the indication of acceptance of the data related to the supplemental information, facilitating a first transmission of the data related to the supplemental information;
   wherein the facilitating the action comprises facilitating a second transmission of information representative of an incentive associated with the action related to the supplemental information, wherein the incentive comprises information representative of a defined interval for performance of the action; and
   terminating an availability of the incentive after an expiration of the defined interval.

19. The non-transitory machine-readable storage medium of claim 17, wherein the indication is a first indication, and wherein the operations further comprise:
   receiving a second indication to place data related to the supplemental information in a queue; and
   facilitating storage of the data related to the supplemental information in a storage device accessible by the communication device.

20. The non-transitory machine-readable storage medium of claim 19, wherein the action is a first action, and wherein the operations further comprise:
   determining an expiration of a defined interval after the data related to the supplemental information is retained in the storage device;
   facilitating an output of the data related to the supplemental information from the communication device; and
   facilitating a second action related to the supplemental information.

* * * * *